United States Patent
Poola et al.

(10) Patent No.: US 6,752,131 B2
(45) Date of Patent: Jun. 22, 2004

(54) ELECTRONICALLY-CONTROLLED LATE CYCLE AIR INJECTION TO ACHIEVE SIMULTANEOUS REDUCTION OF $NO_x$ AND PARTICULATES EMISSIONS FROM A DIESEL ENGINE

(75) Inventors: Ramesh B. Poola, Naperville, IL (US); Richard J. Lill, Naperville, IL (US); Paul Gottemoller, Palos Park, IL (US); Keith E. Solomons, Chicago, IL (US); Michael Barry Goetzke, Orland Park, IL (US); Richard Wayne Tupek, Naperville, IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/193,555

(22) Filed: Jul. 11, 2002

(65) Prior Publication Data

US 2004/0007217 A1 Jan. 15, 2004

(51) Int. Cl.[7] .............................................. F02M 23/00
(52) U.S. Cl. ....................................................... 123/533
(58) Field of Search ................................. 123/531, 533, 123/532, 535

(56) References Cited

U.S. PATENT DOCUMENTS

| | | |
|---|---|---|
| 3,017,872 A | 1/1962 | Candelise |
| 3,043,281 A | 7/1962 | Candelise |
| 3,043,289 A | 7/1962 | Fox |
| 3,195,518 A | 7/1965 | Candelise |
| 3,630,021 A | 12/1971 | Bishop |
| 3,814,065 A | 6/1974 | Gospodar |
| 3,851,632 A | 12/1974 | Teshirogi et al. |
| 4,192,262 A | 3/1980 | Ohuda et al. |
| 4,782,809 A * | 11/1988 | Kotowski ................... 123/531 |
| 4,899,714 A * | 2/1990 | Schecter ...................... 123/533 |
| 4,924,823 A | 5/1990 | Ogura et al. |
| 5,190,216 A * | 3/1993 | Deneke ....................... 123/533 |
| 5,832,725 A | 11/1998 | Sim |
| 6,047,671 A * | 4/2000 | Tubb et al. ................... 123/73 |
| 6,173,567 B1 | 1/2001 | Pool et al. |

OTHER PUBLICATIONS

Kittleson, D.B., 1998, "Engines and Nanoparticles: A Review," *J. Aerosol Science*, 29(5/6):575–588.

Alkidas, A.C., 1987, "On the Premixed Combustion in a Direct–Injection Diesel Engine," *ASME Journal of Gas Turbines and Power*, 109:87–192.

Choi et al., 1995, "In–Cylinder Augmented Mixing through Controlled Gaseous Jet Injection," SAE paper 952358.

Kamimoto et al., 11983, "An Air Cell DI Diesel Engine and Its Soot Emission Characteristics," SAE paper 831297.

(List continued on next page.)

*Primary Examiner*—Bibhu Mohanty
(74) *Attorney, Agent, or Firm*—Cary W. Brooks

(57) ABSTRACT

An electronically-controlled air injection system implemented in three different embodiments with respect to each cylinder. A first embodiment includes a T-adapter, an air solenoid, a fuel injector, and a control unit. The T-adapter receives pressurized fuel and pressurized air from an air solenoid, and outputs these to the fuel injector. The air solenoid controls the flow of air to the fuel injector via the control unit. The second embodiment includes a modified fuel injector, an air solenoid, and a control unit. The fuel injector is modified by forming therein an air passage and a communicating sac, wherein the sac communicates with the fuel valve. Compressed air is supplied through an air solenoid to the air passage. The third embodiment includes a modified cylinder head, an air solenoid, and a control unit. Compressed air is supplied through an air solenoid to at least one combustion chamber cylinder port in the cylinder head.

15 Claims, 6 Drawing Sheets

OTHER PUBLICATIONS

Murayama et al., 1989, "Reduction of Smoke and $NO_x$ Emissions by Active Turbulence Generated in the Late Combustion Stage in D.I. Diesel Engines," Proc. $18^{th}$ Symp. Int. Con. Combustion Eng., D132, pp. 1129–1141.

Konno et al., 1992, "Reduction of Smoke and $NO_x$ by Strong Turbulence Generated During the Combustion Process in D.I. Diesel Engines," SAE Paper 920467.

Kawazoe et al., 1990, "Reduction of Soot Emission by Air–Jet Turbulence Generator with Cam in a Diesel Engine," JSAE 902116.

Nagano et al., 1991, "Reduction of Soot Emission by Spring Accumulated Air–Jet Generator in DI Diesel Engine," $9^{th}$ Int'l Combustion Eng. Symp. Japan, 231, p. 439–444.

Golding, L., 1992, "The Effects of Augmented Mixing on Diesel Combustion," M.S. Thesis, Mechanical Engineering Department, University of Wisconsin–Madison.

Mather, D., R. Reitz, 1995, "Modeling the Use of Air Injection for Emissions Reduction in a Direct–Injected Diesel Engine," SAE Paper 952359.

Hong, H., T. Krepec, and R.M.H. Cheng, 1993, "Optimization of Electronically Controlled Injectors for Direct Injection of Natural Gas in Diesel Engines," SAE Paper 930928.

Barkhimer, R.L., and H.C. Wong, 1995, "Application of Digital, Pulse–Width–Modulated, Sonic Flow Injectors for Gaseous Fuels," SAE Paper 951912.

Huang, Q., and R. Chen, 1996, "An Investigation into the Use of Fluidic Devices as Gas Fuel Injectors for Natural Gas Engines," SAE Paper 960768.

Chen, R., and G.G. Lucas, 1996, "An Investigation into the Use of Piezo–Fluidic Combined Units as Fuel Injectors for Natural Gas Engines," SAE Paper 961987.

Sturman, O.E., J.A. Pena, and P.W. Peterson, 1995, "A CNG Specific Fuel Injector Using Latching Solenoid Technology," SAE Paper 951914.

Hodgins, K.B., P.G. Hill, P. Ouellette, and P. Hung, 1996, "Directly Injected Natural Gas Fueling of Diesel Engines," SAE Paper 961671.

"Natural Gas Fueling of Diesel Engines," Automotive Engineering, Nov. 1996, pp. 87–90.

Meyers, D.P., G.D. Bourn, J.C. Hedrick, and J.T. Kubesh, 1997, "Evaluation of Six Natural Gas Combustion Systems for LNG Locomotive Applications," SAE Paper 972967.

Kurtz, E.M., and Foster, D.E., 1998, "Exploring the Limits of Improving DI Diesel Emissions By Increasing In–Cylinder Mixing," SAE Paper 982677.

Tanaka, Y, and Shimamoto, Y., 1975, "A Study on the Improvement of Combustion performance," Bulletin of the JSME, V. 18, No. 123, pp 1061–1068.

Konno, M., Chikahisa, T., and Murayama, T, 1993, "An Investigation on the Simultaneous Reduction of Particulate and $NO_x$ by Controlling Both the Turbulence and the Mixture Formulation in DI Diesel Engines," SAE Paper 932797.

* cited by examiner

ELECTRONICALLY-CONTROLLED LATE CYCLE AIR INJECTION TO ACHIEVE SIMULTANEOUS REDUCTION OF $NO_X$ AND PARTICULATES EMISSIONS FROM A DIESEL ENGINE

TECHNICAL FIELD

The present invention relates generally to reducing emissions from diesel engines and more specifically to electronically-controlled air injection to achieve simultaneous reduction of $NO_X$ and particulates emissions from a diesel engine.

BACKGROUND OF THE INVENTION

Despite the numerous advantages and widespread usage of diesel engines, particulates (including soot and hydrocarbons) and oxides of nitrogen emissions from these engines are pollutants which engine manufacturers seek to minimize. Oxides of nitrogen, NO and $NO_2$, commonly referred to as $NO_X$, are formed by the reaction of nitrogen and oxygen from the combustion of the air-fuel mixture at high temperatures during the diesel combustion stroke. The high-temperature combustion of the diesel engine which is responsible for its high efficiency is also the cause of its NOx emissions. Particulates are conglomerates formed during combustion that may consist of large aromatic molecules with very high carbon-to-hydrogen ratios, inorganic species originating in the lube oil, sulfates from the oxidation of fuel sulfur, unburned fuel or lube oil, and products from the partial combustion of fuel or lube oil. It is difficult to control both particulates and NOx emissions simultaneously and cost-effectively without imposing significant penalties in fuel economy and/or power on diesel engines because of their inherent trade-off characteristics.

The diesel engine combustion process consists of an initial premixed stage in which chemical kinetics are rate controlling, followed by a diffusion stage in which mixing is rate controlling. Both $NO_X$ and particulate formation rates are generally high in the premixed stage because of higher energy release rates. The diffusion stage of the combustion process is generally associated with lower energy release rates than those of the premixed stage. The energy release at this stage is controlled by the mixing rate since, during this period, the characteristic time of combustion is much shorter than the characteristic time of fuel-air mixing. The mixing process is very important in determining the particulates oxidation rates. By enhancing turbulent mixing during the diffusion stage of the combustion cycle (where particulates oxidation is more pronounced) without disturbing the region of $NO_X$ formation, a reduction in visible smoke, hydrocarbons, and particulates in general can be achieved.

Previous analytical studies have shown that many factors will influence the effectiveness of late-cycle air injection. These include beginning of air injection, duration of air injection, air injection pressure, temperature, air composition, nozzle geometry (orifice diameter, number of holes, orifice aspect ratio), orifice orientation with respect to cylinder axis, location of the injector, beginning of fuel injection timing, fuel injection pressure, duration of fuel injection, fuel injection rate and shape, and composition of combustion air. Conceivably, the impact of late-cycle air injection would be significant if an air jet follows the fuel spray, or the combusting fuel spray plume. However, there is no practical (commercially available) system to perform direct combustion chamber air injection in diesel engines. Direct air injection through an additional injector might increase the system complexity and cost, and, hence, it is not preferable.

Accordingly, there is a clearly-felt need in the art for achieving simultaneous reduction of $NO_X$ and particulates in a diesel engine without reducing power output or fuel economy.

SUMMARY OF THE INVENTION

The present invention is an electronically-controlled late cycle injection of supplemental air to achieve simultaneous reduction of $NO_X$ and particulates emissions from a diesel engine without sacrificing its power output or fuel economy, wherein minimal modifications are required to the power assembly and fuel injection equipment, which modifications may be in the form of original engine manufacture or retrofit.

According to the present invention, a high-pressure jet of supplemental air is introduced into the cylinder (specifically, the combustion chamber thereof) late in the diesel cycle which serves to reduce particulate emissions over a broad range of engine operating conditions. When the supplemental air injection is coupled with $NO_X$ reducing methods, such as retarded fuel injection timing, multiple injections, or exhaust gas recirculation, simultaneous reduction of both $NO_X$ and particulate emissions is realized.

Controlled quantities of supplemental air, at relatively higher pressure than the combustion chamber combustion pressure, are introduced directly into the combustion chamber during the combustion (also referred to as the expansion) stroke or during the combustion and exhaust strokes of the diesel cycle. The mass of injected supplemental air is relatively small (about 2% to 10% of the total airflow) compared to the main intake airflow. The jet momentum of the supplemental air serves to augment turbulent mixing and also increases the partial pressure of oxygen in the gases surrounding the burning fuel droplets. These changes in mixing and chemical kinetics help to enhance the particulates (soot and hydrocarbon) oxidation and gas-phase hydrocarbon combustion reactions without adversely affecting $NO_X$ formation due to the supplemental air promoting a higher oxygen concentration and average lower temperature in the combustion zone. As a result of these enhanced oxidation reactions, visible smoke, unburned hydrocarbons, and total particulate emissions will be significantly reduced. The decreasing temperature, due to expansion and mixing of high-temperature gas with the supplemental air or cooler burned gas, freezes the oxides of nitrogen chemistry. This chemistry freezing effect occurs more rapidly in diesel engines and much less decomposition of the oxides of nitrogen occurs. The timing and delivery parameters for injection of diesel fuel, as well as the supplemental air, are electronically controlled so that $NO_X$ formation can still be reduced during the premixed and early diffusion stages of the diesel combustion cycle. The addition of supplemental air directly into the combustion chamber of a diesel engine has the potential to reduce both $NO_X$ and particulate emissions simultaneously, and lessens the trade-off between them.

These emissions reductions are achieved with the following major components:

a) a source of supplemental air in the form of a small portion of the engine's intake air diverted from the intake manifold (filtered air at intake boost conditions);

b) a high-pressure compressor and/or a pump (piston, diaphragm or rotary type) to pressurize the supplemental air (for example, to pressures ranging up to 5,000 psi), wherein the pressure should generally be greater than the combustion chamber combustion pressure;

c) an accumulator or rail to hold the pressurized supplemental air and supply lines to the individual injectors;

d) an electronically-controlled solenoid valve to actuate the supply of the supplemental air into each injector, respectively;

e) an injector mounted on the cylinder head with one of more orifices to inject the supplemental air with a desired spray pattern directly into the respective combustion chamber; and f) an electronic control system to control injection timing and delivery characteristics of the supplemental air during the combustion stroke or during the combustion and exhaust strokes of each cylinder, respectively, of a diesel cycle, wherein the beginning of supplemental air injection with respect to piston position in the cylinder, injection pressure, and duration of injection are all electronically controlled.

The electronically-controlled supplemental air injection system according to the present invention may be implemented in any of three different embodiments.

A first embodiment of an electronically-controlled supplemental air injection system includes a T-adapter, an air solenoid, a control unit, and a fuel injector. The T-adapter receives pressurized fuel from a fuel pump through a fuel check valve and pressurized air from a source of compressed air through an air solenoid and then an air check valve. The pressurized fuel and supplemental air are output from the T-adapter through the fuel injector, wherein the air solenoid controls the flow of supplemental air to the fuel injector. The air check valve prevents fuel from entering the air line and the fuel check valve prevents air from entering the fuel line. A computer control device dynamically controls the opening and closing of the air solenoid according to timing appropriate to a predetermined specific cycle of a diesel engine and the operating conditions of the engine.

A second embodiment of an electronically-controlled supplemental air injection system includes a modified fuel injector, an air solenoid, and a control unit. The fuel injector is modified by forming an air passage through an outside perimeter to a sac thereof. The sac is located below a needle of the fuel injector. Compressed supplemental air is supplied through an air solenoid to an input of the air passage on the outside perimeter of the fuel injector. The supplemental air is supplied to the sac when the control unit opens the air solenoid. The supplemental air flows from the sac through an orifice in a tip of the fuel injector. A computer control device dynamically controls the opening and closing of the air solenoid according to timing appropriate to a predetermined specific cycle of a diesel engine and the operating conditions of the engine.

A third embodiment of an electronically-controlled supplemental air injection system includes a cylinder head with at least one air passage, at least one cylinder passage valve, an air solenoid, and a control unit. The cylinder head will not have to be modified if it already contains cylinder relief passages, as for example for the purpose of testing and safety procedures. A cylinder head not having cylinder relief passages is modified by adding at least one air passage per cylinder. The cylinder relief valves are replaced with cylinder passage valves or added to the air passages in the modified cylinder head. Compressed supplemental air is supplied through the air solenoid to each cylinder air passage. The supplemental air passes into a particular combustion chamber when the control unit opens the air solenoid and the combustion chamber's respective cylinder passage valve. A computer control device dynamically controls the opening and closing of the air solenoid according to timing appropriate to a predetermined specific cycle of a diesel engine and the operating conditions of the engine.

With regard to the aforementioned timing, the supplemental air is injected into a combustion chamber during, preferably, one of two specific time periods during the diesel cycle. In a first specific time period example, supplemental air is injected into the combustion chamber when the piston is at top dead center (TDC) at the start of the combustion stroke and continues until the exhaust valve is opened. In a second specific time period example, supplemental air is injected into the combustion chamber when the piston is at TDC at the start of the combustion stroke and continues until the piston is at TDC at the end of the exhaust stroke.

Accordingly, it is an object of the present invention to provide electronically-controlled supplemental air injection to achieve simultaneous reduction of $NO_X$ and particulates emissions from a diesel engine without reducing power output or fuel economy thereof.

This and additional objects, features and advantages of the present invention will become clearer from the following specification of a preferred embodiment.

DESCRIPTION OF THE PREFERRED EMBODIMENT

Figure 1:
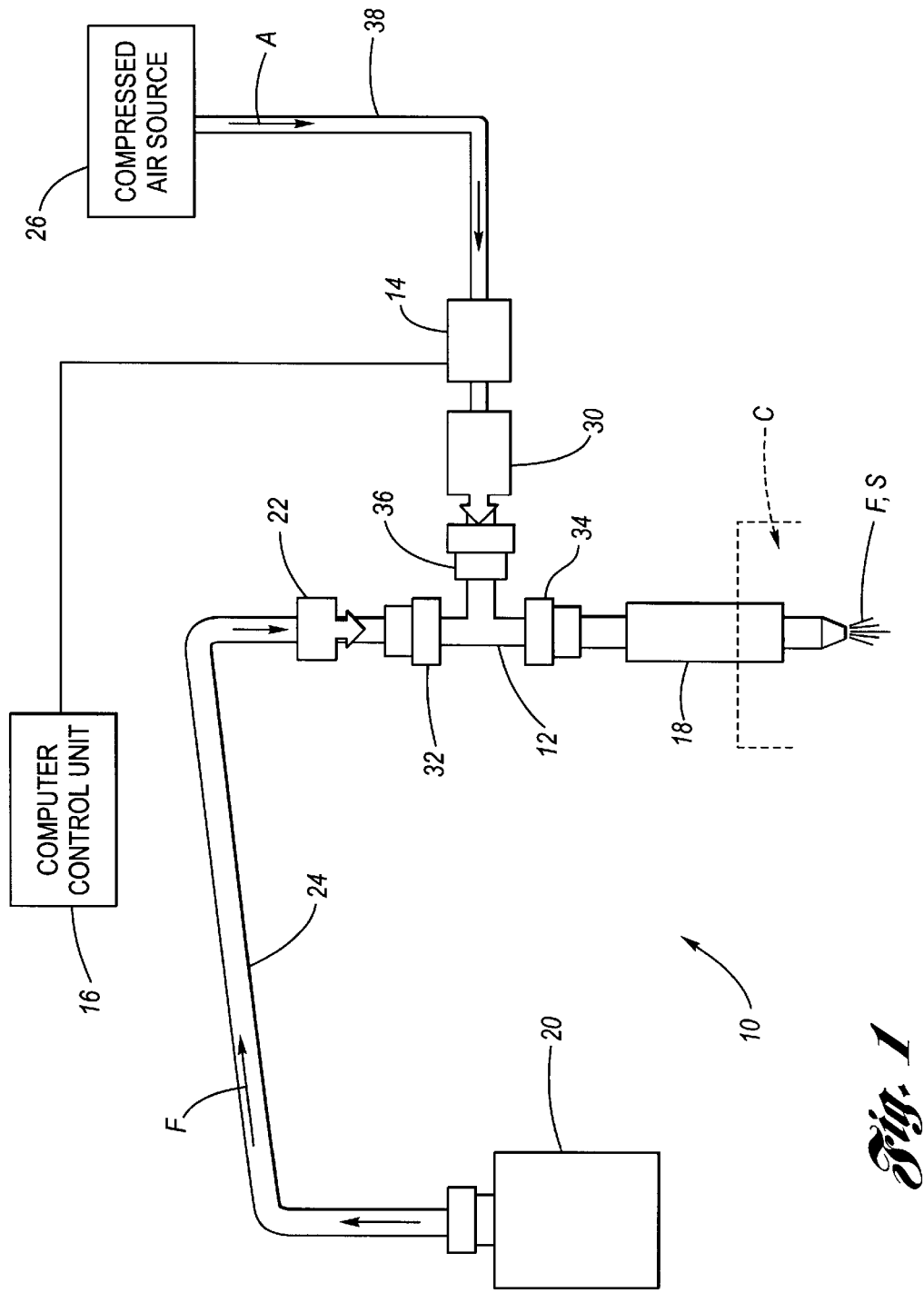
FIG. 1 is a side view of a first embodiment of an electronically-controlled supplemental air injection system according to the present invention.
Figure 2:
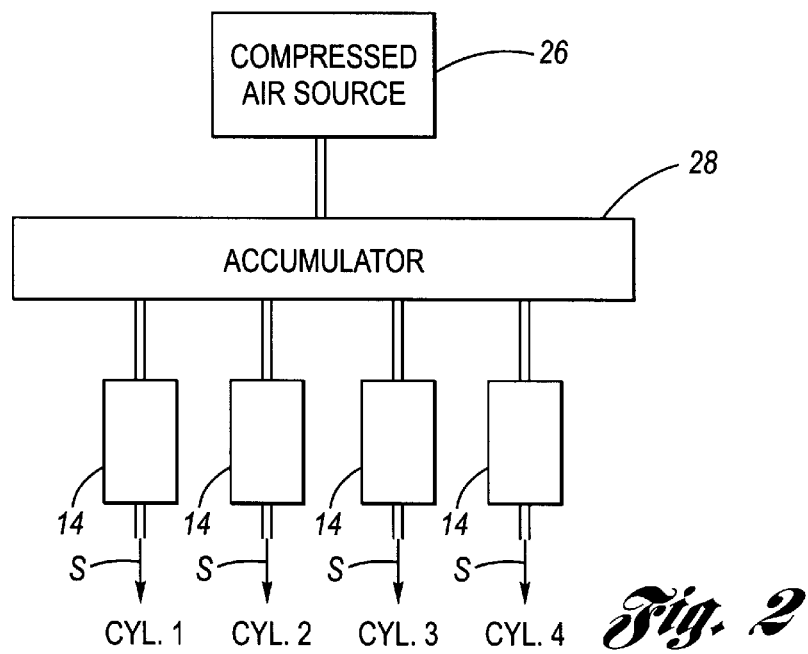
FIG. 2 is a schematic diagram, further to FIG. 1, showing a compressed air source with an accumulator for supplying a plurality of cylinders with supplemental air.

Referring now to the drawings, FIG. 1 depicts a first embodiment of an electronically-controlled air injection system 10. The electronically-controlled air injection system 10 includes a T-adapter 12, an air solenoid 14, a control unit 16, and a fuel injector 18 for a respective cylinder C. The T-adapter 12 has three ports. An air input port 36 of the T-adapter 12 receives compressed air A from a compressed air source 26 through the air solenoid 14 via an air line 38, wherein one end of the air solenoid is coupled to the compressed air source and the other end is coupled to the air input port. A fuel input port 32 of the T-adapter 12 receives pressurized fuel F from a fuel pump 20. A fuel check valve 22 prevents compressed air from entering the fuel line 24, and an air check valve 30 prevents fuel from entering the air line 38. The compressed air source 26 could utilize air diverted from the intake manifold, air cooler duct box, or any other suitable air source, wherein the air is compressed to, for example 2,000 to 3,000 psi so as to be above in-cylinder combustion pressure, by, for example, a separate compressor or cam-actuated piston pump. The fuel and air lines 24, 38 are branched for each cylinder. It is preferable to have an accumulator 28 or a rail which has a quantity of available compressed air for each air solenoid 14 for injection of supplemental air S into the respective combustion chamber of a plurality of cylinders (i.e., cyl. 1, cyl. 2, cyl. 3, cyl. 4, etc.), as shown at FIG. 2.

The pressurized fuel F and compressed air A are directed under independent control through the T-adapter 12 and into the fuel injector 18. Fuel F enters through the fuel input port 32, compressed air A enters through the air input port 36, and both are expelled through an output port 34 of the T-adapter 12. The air solenoid 14 regulates the flow of compressed air A to an air input port 36 of the T-adapter 12 via commands from the control unit 16 according to specific time periods during the diesel cycle. The control unit 16 could be an existing engine control module which is modified to have additional outputs for controlling at least one air solenoid 14 or may be a dedicated control unit. Either the dedicated control unit or a modified engine control module is programmed to inject fuel F and independently inject supplemental air S derived from the compressed air A by opening the at least one air solenoid 14 for a dynamically appropriate time period, as discussed hereinbelow.

Figure 4:
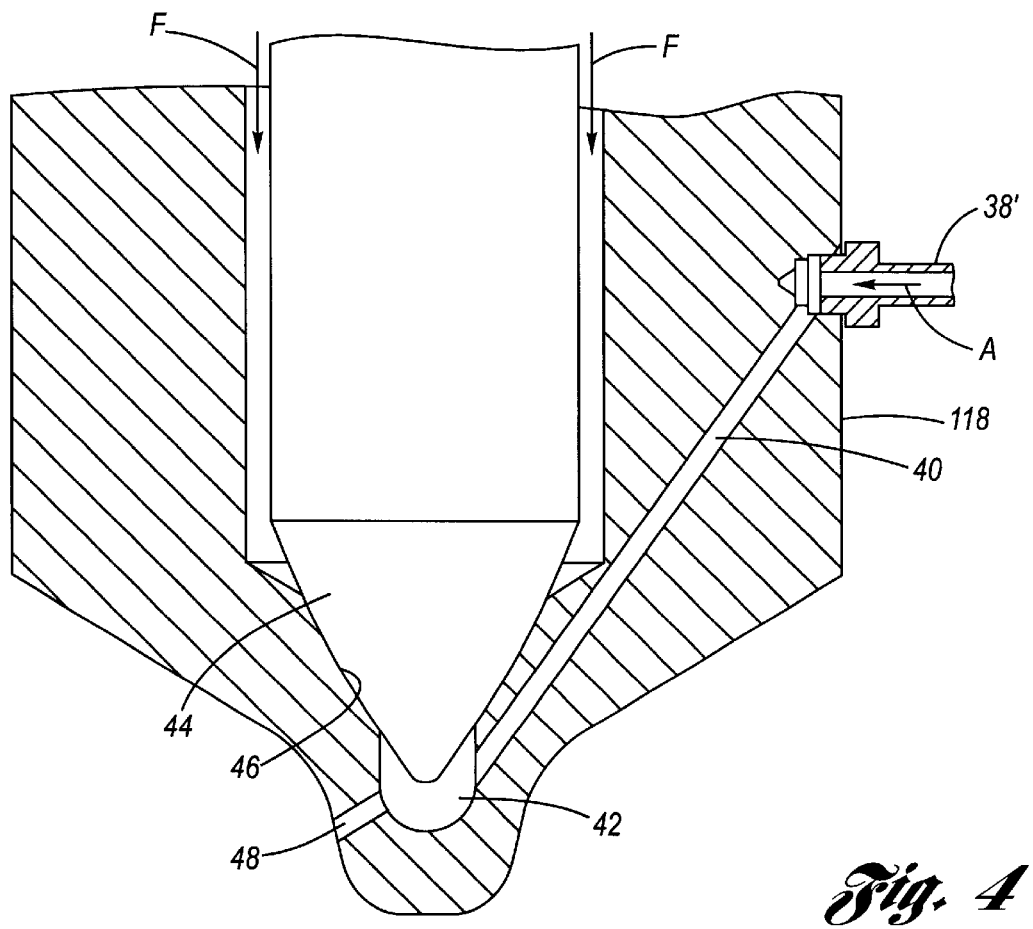
FIG. 4 is an enlarged partially cross-sectional view, further to FIG. 3, of a modified fuel injector of a second embodiment of an electronically-controlled supplemental air injection system.
Figure 3:
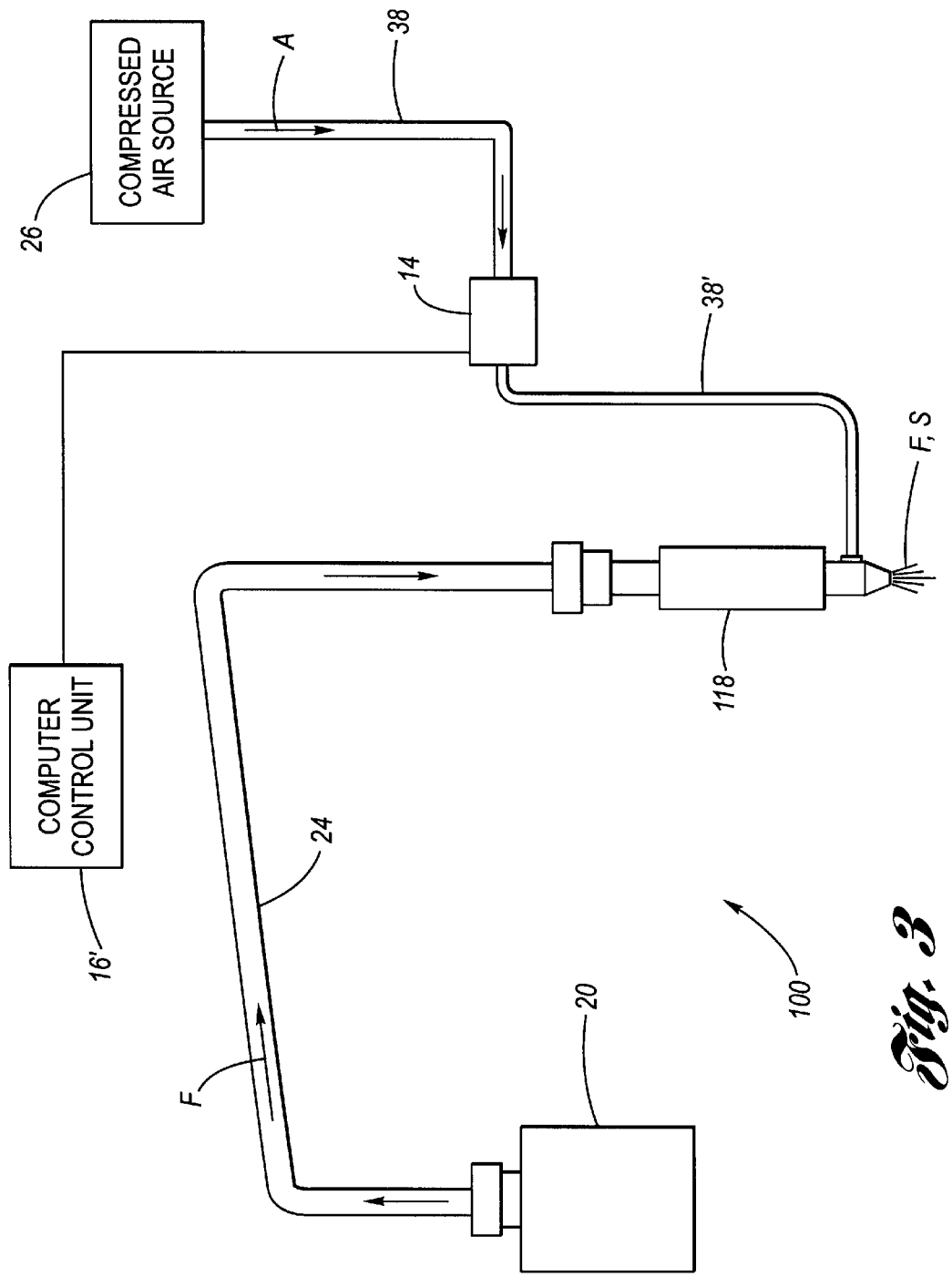
FIG. 3 is a side view of a second embodiment of an electronically-controlled supplemental air injection system according to the present invention.

With reference to FIGS. 3 and 4, a second embodiment of an electronically-controlled air injection system 100 includes a modified fuel injector 118, the air solenoid 14, and a control unit 16'. The previously described fuel injector 18 is now modified, as shown at FIG. 4, by forming an air passage 40 which communicates with a portion of the air line 38' and a sac 42 of the modified fuel injector 118. The sac 42 is located below a fuel valve composed, for example, of a needle 44 and needle seat 46 of the modified fuel injector 118. Compressed air A is regulated through the air solenoid 14 to the passage 40, wherein the compressed air is supplied to the sac 42 and then flows out through an orifice 48 to a combustion chamber external thereto. Fuel F flows through fuel passages 50 into the sac 42 and then out to the combustion chamber through the orifice 48 when the needle 44 opens relative to the needle seat 46. The control unit 16' is programmed to inject fuel F and independently inject supplemental air S derived from the compressed air A by opening the at least one air solenoid 14 for a dynamically appropriate time period, as discussed hereinbelow.

The advantages of the second embodiment include: a) elimination of check valves in the high pressure air and fuel lines; b) lower fill volumes for both compressed supplemental air and fuel in the injector body; c) supplemental air injection through the same orifices as that of the fuel; and d) supplemental air injection events independent of needle lift (fuel injection events).

Figure 5:
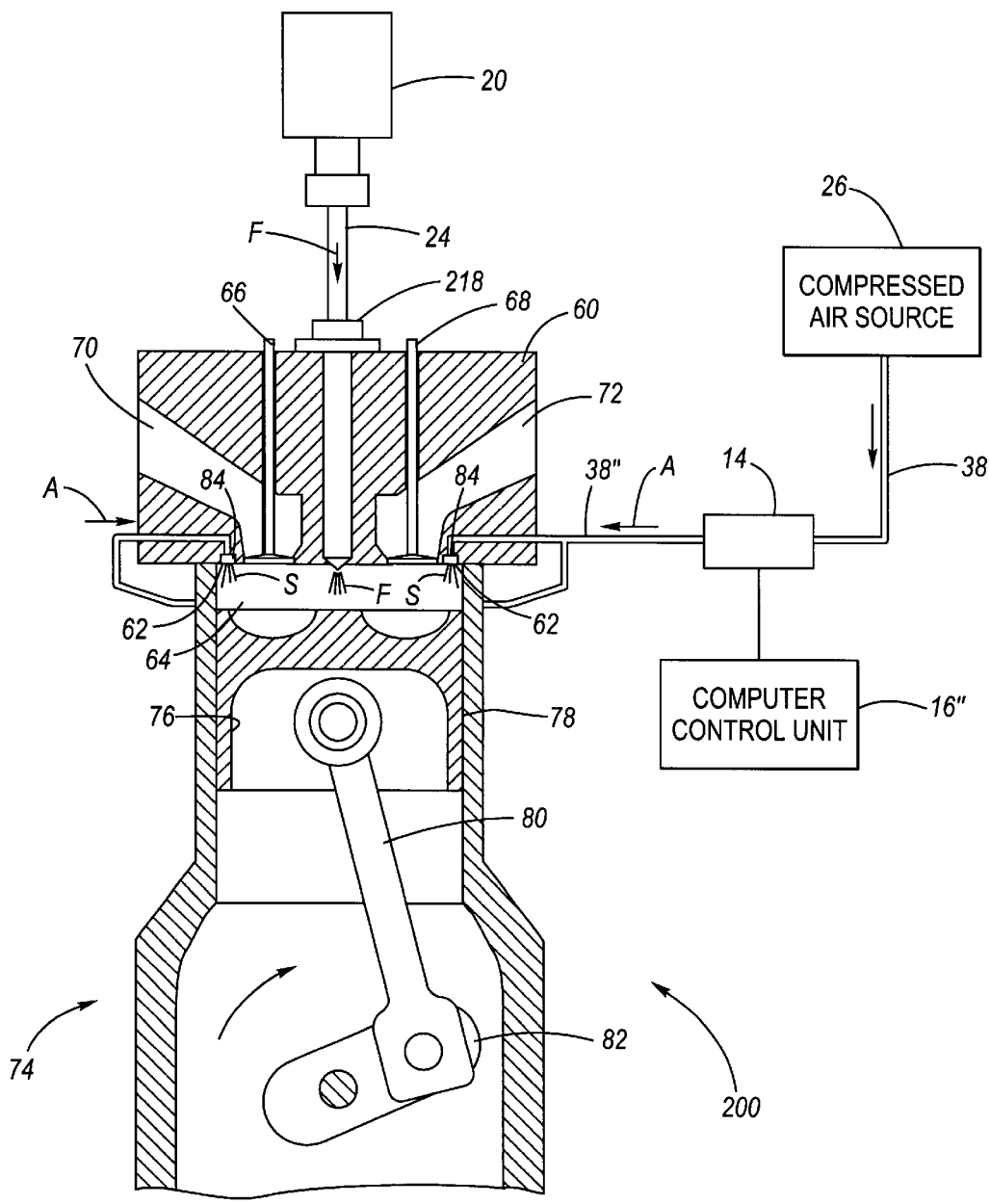
FIG. 5 is a partially cross-sectional view of a third embodiment of an electronically-controlled supplemental air injection system according to the present invention.

With reference to FIG. 5, a third embodiment of an electronically-controlled air injection system 200 includes a modified cylinder head 60 having at least one auxiliary air passage 62, the air solenoid 14, and a control unit 16". The cylinder head of an engine will not have to be modified if it already contains cylinder relief passages, for example, where there are cylinder relief valves (CRV) for testing, inspection, or other purposes. A cylinder head not having cylinder relief passages is modified by forming the at least one auxiliary air passage 62 through an outside perimeter of the cylinder head to a surface area communicating with the combustion chamber 64. The modified cylinder head 60 includes a fuel injector 218, an intake valve assembly 66, an exhaust valve assembly 68, an intake port 70, an exhaust port 72, and the above-mentioned fuel pump 20 and fuel line 24 to the fuel injector. The engine 74 includes a cylinder 76, a piston 78, the aforementioned combustion chamber 64 (located in the cylinder above the piston), a connecting rod 80, and a crankshaft 82. The at least one auxiliary air passage 62 communicates with the air solenoid 14 via an air line 38". Cylinder passage valves 84 are added to the cylinder relief passages, which serve as check valves that allow the flow of compressed supplemental air into the combustion chamber, but prevent the pressurized contents of the combustion chamber from escaping through the auxiliary air passages.

The air solenoid 14 regulates the flow of compressed air to the at least one air passage 62 via commands from the control unit 16" which is programmed to inject fuel F and independently inject supplemental air S derived from the compressed air A by opening the at least one air solenoid 14 for a dynamically appropriate time period, as discussed hereinbelow.

Figure 6A:
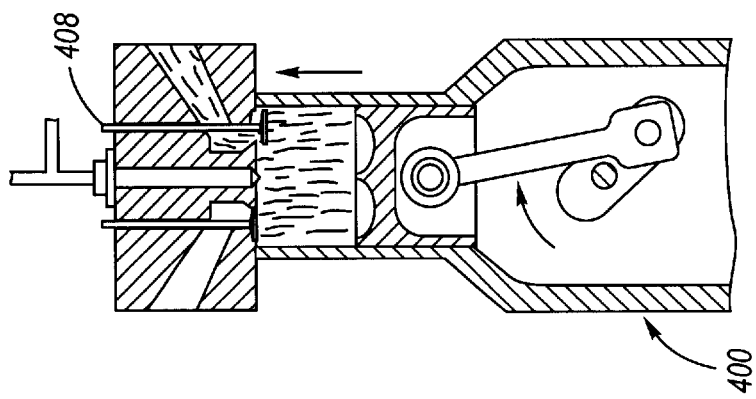
FIG. 6A is a schematic diagram of a four stroke diesel cycle internal combustion engine, depicting the intake stroke thereof according to the present invention.
Figure 6B:
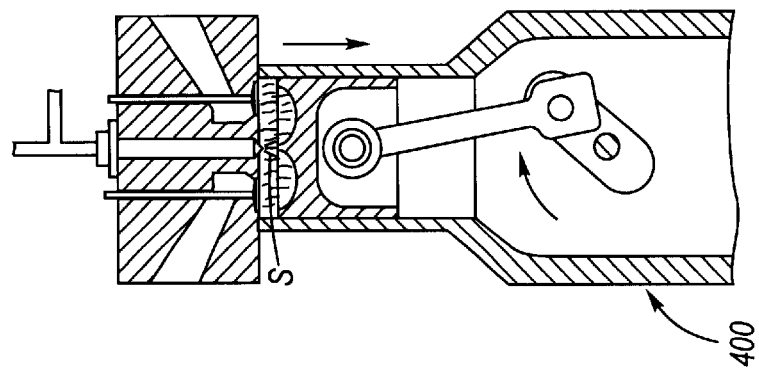
FIG. 6B is a schematic diagram of the diesel cycle of FIG. 6A, depicting the compression stroke thereof according to the present invention.
Figure 6C:
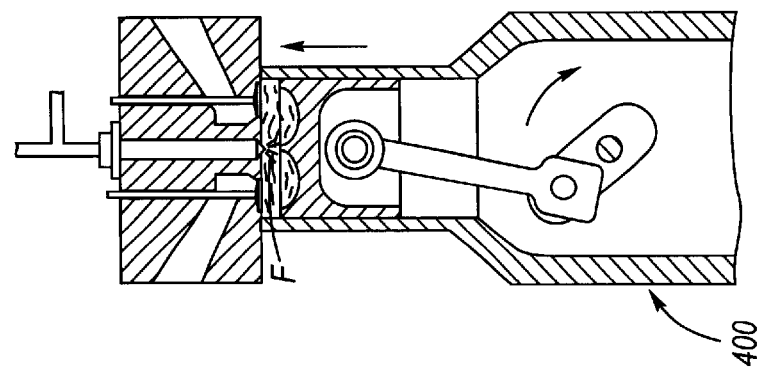
FIG. 6C is a schematic diagram of the diesel cycle of FIG. 6A, depicting the combustion stroke thereof according to the present invention.
Figure 6D:
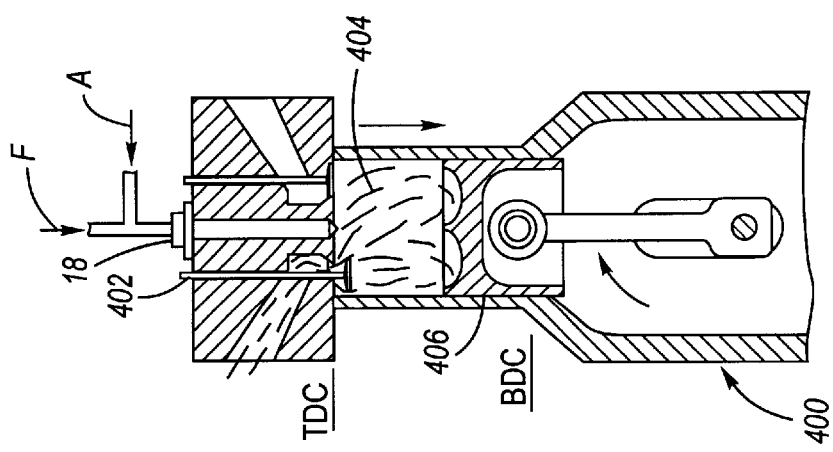
FIG. 6D is a schematic diagram of the diesel cycle of FIG. 6A, depicting the exhaust stroke thereof according to the present invention.

FIGS. 6A through 6D illustrate the four strokes of a diesel cycle internal combustion engine 400 with respect to the first embodiment (one cylinder being shown for simplicity). FIG. 6A shows the intake stroke, wherein the intake valve 402 is open, the exhaust valve 408 is closed, and air is drawn into the combustion chamber 404 through the open intake valve as the piston 406 moves downwardly from top dead center (TDC) toward bottom dead center (BDC). FIG. 6B shows the compression stroke, wherein both the intake and exhaust valves are closed, and the piston moves upwardly toward TDC. Late in the compression stroke, the fuel injector 18 injects fuel F into the combustion chamber. FIG. 6C shows the combustion stroke, wherein the piston is forced toward BDC by gas expansion caused by combustion of the fuel-air mixture in the cylinder. Further, in accordance with the present invention, supplemental air S is injected into the combustion chamber. Finally, FIG. 6D shows the exhaust stroke, wherein the intake valve remains closed, the exhaust valve opens, and the piston moves toward TDC thereby expelling the combusted gases out of the combustion chamber through the exhaust valve.

Figure 7:
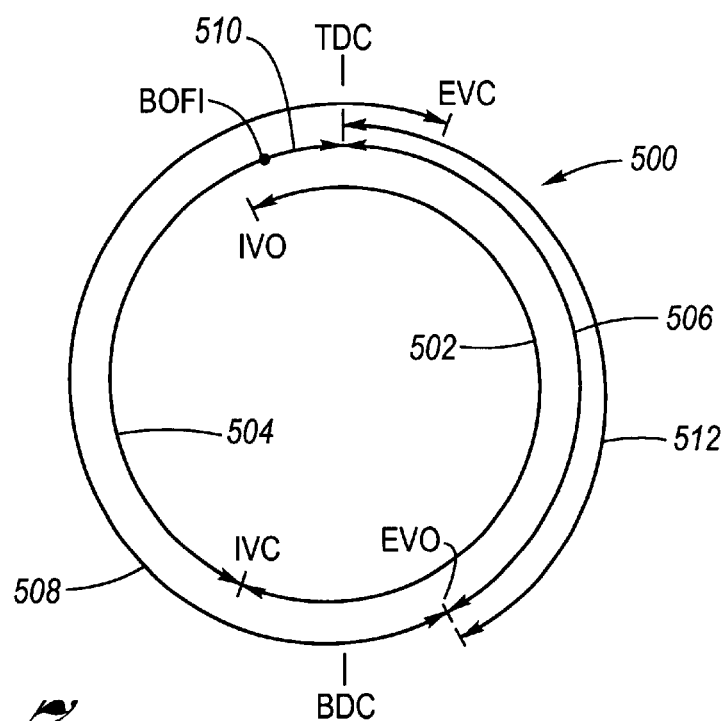
FIG. 7 is a chart of event timing of a four stroke diesel cycle internal combustion engine, showing a first specific time period when supplemental air is injected into the combustion chamber according to the present invention.
Figure 8:
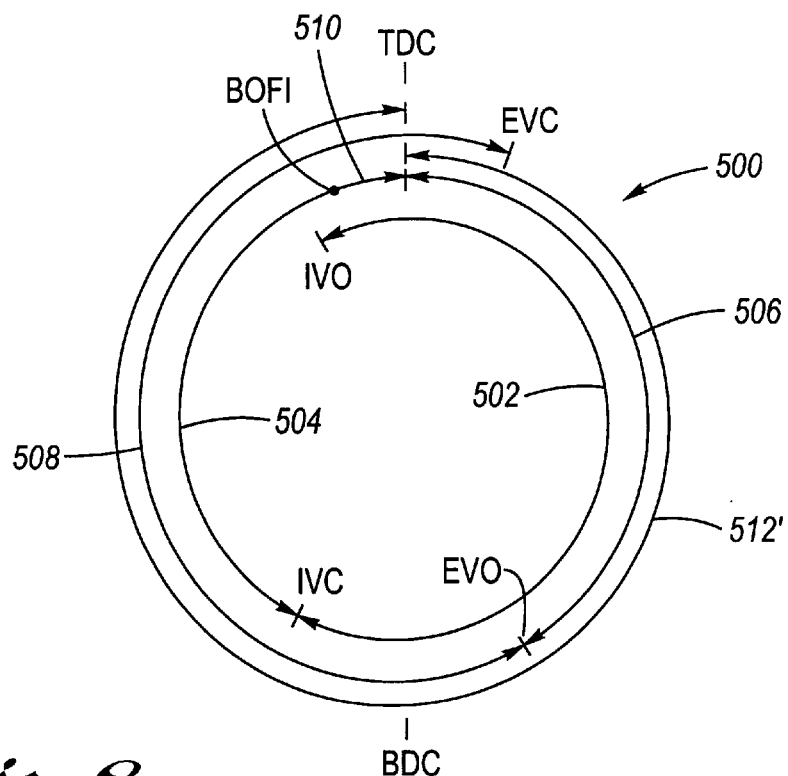
FIG. 8 is a chart of event timing for a four stroke diesel cycle internal combustion engine, showing a second specific time period when supplemental air is injected into the combustion chamber according to the present invention.

With reference to FIGS. 7 and 8, preferred timing of the fuel and supplemental air injections for a four stroke diesel cycle 500, of an internal combustion engine will be detailed. The diesel cycle begins with an intake process 502 delineated between intake valve opening (IVO) and intake valve closing (IVC), wherein the intake stroke goes from piston top dead center (TDC) after IVO to piston bottom dead center (BDC) before IVC. Next is a compression process 504 delineated between IVC and piston TDC, wherein the compression stroke goes from piston BDC before IVC to piston TDC. Next is a combustion process 506 delineated between TDC and exhaust valve opening (EVO), wherein the combustion stroke goes from piston TDC to piston BDC after EVO. Lastly is an exhaust stroke 508 delineated between EVO and exhaust valve closing (EVC), wherein the exhaust stroke goes between piston BDC after EVO and piston TDC before EVC, and wherein there is an overlap of the intake and exhaust processes between successive diesel cycles.

With regard to the preferred timing of the fuel injection process 510, shown at FIGS. 7 and 8, beginning of fuel injection (BOFI) occurs just prior to piston TDC during the later portion of the compression process 504. A computer control module dynamically adjusts the locations of the BOFI and the end of fuel injection per programming relevant to sensed engine operational parameters.

According to a first preferred timing of the supplemental air injection process 512, shown at FIG. 7, supplemental air injection starts at any time upon and after piston TDC of the commencement of the combustion process 506 and continues until the exhaust valve is opened (EVO). The timing of the supplemental air injection process 512 may be advanced, retarded, lengthened and/or contracted per the commands of the engine control module responsive to programming relevant to sensed engine operational parameters.

According to a second preferred timing of the supplemental air injection process 512', shown at FIG. 8, supplemental air injection starts at piston TDC of the commencement of the combustion process 506 and continues until piston TDC of the exhaust process 508. The timing of the supplemental air injection process 512' may be advanced, retarded, lengthened and/or contracted per the commands of the engine control module responsive to programming relevant to sensed engine operational parameters.

In the practice of the present invention, the diesel combustion process can be altered to achieve a favorable $NO_X$ versus particulates exhaust gas emissions tradeoff. In this regard, a two-stage combustion process achieves simultaneous reduction of $NO_X$ and particulate emissions, while improving the fuel efficiency from a diesel engine. During the first stage of combustion, a low temperature of combustion is promoted, which helps to lower the rate of $NO_X$ formation. Low temperature combustion may be promoted by a variety of methodologies, including retarded fuel injection timing, exhaust gas recirculation, injection rate shaping, multiple injections, and membrane-based nitrogen enriched intake air, any of which is considered to be a practical way to achieve combustion at relatively lower overall temperatures. In the second stage of combustion, supplemental air is injected at relatively higher pressure than the pressure in the combustion chamber (about 2000 to 3000 psi) in order to enhance the fuel-air mixing and particulates and gaseous hydrocarbons oxidation at relatively lower combustion temperatures. By promoting combustion in two stages, each at relatively lower temperatures (as compared with conventional combustion processes), $NO_X$ and particulates exhaust gas emissions are reduced. Further, since complete combustion of the fuel is attendantly promoted, fuel efficiency is also increased.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An electronically controlled air injection system for each cylinder of an internal combustion engine, said engine having a piston in each cylinder, at least one exhaust valve of each cylinder, and a source of pressurized fuel, said system comprising:

a fuel injector, the source of pressurized fuel being connected thereto;

means for injecting the pressurized fuel into the cylinder through said fuel injector;

a source of compressed air;

an air solenoid connected to said source of compressed air and to said fuel injector; and a control unit connected to said air solenoid, said control unit selectively opening and closing said air solenoid to thereby selectively supply supplemental air to said fuel injector independently of said means for injecting.

2. The system of claim 1, further comprising a T-adapter having an air input port, a fuel input port and an output port, wherein said fuel injector has an input connected to said output port, the source of pressurized fuel of the engine being connected to said fuel input port and said air solenoid being connected to said air input port, wherein said air solenoid is located between said source of compressed air and said air input port.

3. The system of claim 2, further comprising:

an air check valve located between said fuel input port and the source of pressurized fuel of the engine; and a fuel check valve located between said air input port and said air solenoid.

4. The system of claim 3, wherein said source of compressed air comprises:

an accumulator connected the air solenoid of each cylinder of the engine; and an air compression apparatus which supplies the compressed air to the accumulator.

5. The system of claim 4, wherein the selective opening and closing of said air solenoid provides a time duration of the supply of the supplemental starting substantially when the piston of the cylinder is at top dead center of a combustion stroke and continuing substantially until the at least one exhaust valve of the cylinder is opened.

6. The system of claim 4, wherein the selective opening and closing of said air solenoid provides a time duration of the supply of the supplemental starting substantially when the piston of the cylinder is at top dead center of a combustion stroke and continuing substantially until the piston is at top dead center of an exhaust stroke.

7. The system of claim 1, wherein said fuel injector comprises:

an input connected to said source of fuel;

an output;

a fuel valve located between said input and said output; and a sac communicating with said fuel valve and said output, said air solenoid being connected to said sac.

8. The system of claim 7, wherein said source of compressed air comprises:

an accumulator connected the air solenoid of each cylinder of the engine; and an air compression apparatus which supplies the compressed air to the accumulator.

9. The system of claim 8, wherein the selective opening and closing of said air solenoid provides a time duration of the supply of the supplemental starting substantially when the piston of the cylinder is at top dead center of a combustion stroke and continuing substantially until the at least one exhaust valve of the cylinder is opened.

10. The system of claim 8, wherein the selective opening and closing of said air solenoid provides a time duration of the supply of the supplemental starting substantially when the piston of the cylinder is at top dead center of a combustion stroke and continuing substantially until the piston is at top dead center of an exhaust stroke.

11. An electronically controlled air injection system for each cylinder of an internal combustion engine, said engine having a piston in each cylinder, at least one exhaust valve of each cylinder, and a source of pressurized fuel, said system comprising:

at least one cylinder passage;

a source of compressed air;

an air solenoid connected to said source of compressed air and to said at least one cylinder passage; and a control unit connected to said air solenoid, said control unit selectively opening and closing said air solenoid to thereby selectively supply supplemental air free of fuel to said at least one cylinder passage.

12. The system of claim 11, further comprising at least one air check valve respectively located at said at least one cylinder passage.

13. The system of claim 12, wherein said source of compressed air comprises:

an accumulator connected the air solenoid of each cylinder of the engine; and an air compression apparatus which supplies the compressed air to the accumulator.

14. The system of claim 13, wherein the selective opening and closing of said air solenoid provides a time duration of the supply of the supplemental starting substantially when the piston of the cylinder is at top dead center of a combustion stroke and continuing substantially until the at least one exhaust valve of the cylinder is opened.

15. The system of claim 13, wherein the selective opening and closing of said air solenoid provides a time duration of the supply of the supplemental starting substantially when the piston of the cylinder is at top dead center of a combustion stroke and continuing substantially until the piston is at top dead center of an exhaust stroke.

* * * * *